(12) United States Patent
L'Bassi et al.

(10) Patent No.: US 7,000,465 B1
(45) Date of Patent: Feb. 21, 2006

(54) ATTITUDE ERROR SELF-CORRECTION FOR THERMAL SENSORS OF MASS FLOW METERS AND CONTROLLERS

(75) Inventors: Michael L'Bassi, Sterling, MA (US); Mark J. Quaratiello, Atkinson, NH (US); Ronald H. Bouley, Windham, NH (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/943,377

(22) Filed: Sep. 17, 2004

(51) Int. Cl.
*G01F 1/68* (2006.01)

(52) U.S. Cl. ............................................... 73/204.27

(58) Field of Classification Search ............. 73/204.27, 73/204.11, 202.5, 65.01, 65.06, 65.09, 433, 73/365, 366.11, 366.13
See application file for complete search history.

(56) References Cited

U.S. PATENT DOCUMENTS

| | | | |
|---|---|---|---|
| 3,584,503 A * | 6/1971 | Senour | 73/65.06 |
| 3,938,384 A | 2/1976 | Blair | |
| 4,056,975 A | 11/1977 | LeMay | |
| 5,191,793 A | 3/1993 | Drexel et al. | |
| 5,279,154 A | 1/1994 | Vavra et al. | |
| 5,952,571 A * | 9/1999 | Arai et al. | 73/204.11 |
| 6,637,264 B1 * | 10/2003 | Lotters et al. | 73/204.27 |

* cited by examiner

*Primary Examiner*—Harshad Patel
*Assistant Examiner*—Corey D. Mack
(74) *Attorney, Agent, or Firm*—McDermott Will & Emery LLP

(57) ABSTRACT

A system for and method of compensating for attitude sensitivity of at least two thermal sensor coils mounted on a tube through which a fluid flows along a common axis of flow for use in generating a flow measurement signal representative of the flow of fluid through the tube is disclosed. One of the coils is adapted in provide thermal energy to the fluid flowing through the tube at an upstream location so as to establish and measure the upstream temperature of the fluid at the upstream location, and one of the coils is adapted to measure the downstream temperature of the fluid at a downstream location. The flow measurement signal is a function of the difference between the measured upstream and downstream temperatures. The system includes structure for, and the method includes the steps of measuring the force of gravity in the direction of the common axis; and modifying the flow measurement signal as a function of the measured force of gravity.

8 Claims, 3 Drawing Sheets

ATTITUDE ERROR SELF-CORRECTION FOR THERMAL SENSORS OF MASS FLOW METERS AND CONTROLLERS

TECHNICAL FIELD

The invention relates to mass flow measurement, and more particularly to attitude error self-correction for thermal sensors of mass flow meters and controllers.

BACKGROUND OF THE INVENTION

Various semiconductor processes require careful control of the amount, i.e., the mass, of material (usually in the form of a gas or vaporized liquid) provided to a work piece during fabrication. As a consequence, devices known as flow sensors have been devised to sense the mass flow of a gas or vapor. Flow sensors can be configured to meter the flow rate of a material, or when combined with control devices control the amount of the material being delivered to a work piece.

The two common types of sensors are pressure-based sensors and thermal-based sensors. Thermal-based sensors are devices which operate on heat transfer principles. A common commercial form incorporates a small diameter tube of capillary-sized dimensions, the tube having two coils of wire wound on the outside of the capillary tube in close proximity to each other. The coils are formed from a material having a resistance which is temperature-sensitive, i.e., has a resistance as a function of temperature. Opposite ends of the capillary tube are in fluid communication with a larger tube which transports the gas or vapor between a source of the gas or vapor and the processing station where the gas or vapor is utilized. A laminar flow element is disposed within the portion of the larger tube called the bypass, between the upstream and downstream connections of the capillary tube to the larger tube. The laminar flow element insures that the flow of gas or vapor through the bypass is laminar flow. As a gas or vapor flows through the sensor predetermined portions of the gas flow through both the bypass and capillary tubes in a predetermined ratio known as a bypass ratio. By sensing the flow rate through the capillary tube, and knowing the bypass ratio, the flow rate through the entire sensor is proportional to the measured flow rate through the capillary tube.

The coils are connected in a bridge-type analog electrical circuit, or to the input of a digital system. The coils can then be heated by an electrical current to provide equal resistances in the absence of flow of the gas, and in the case of an analog electrical bridge-type circuit a balanced condition—e.g., a null output signal. Alternatively, the two coils can be heated by an electrical current, and the two resistances measured with a digital circuit.

Then, with the gas flowing within the tube, within the relevant measuring range of the sensor, the temperature of the upstream coil is decreased by the cooling effect of the gas and the temperature of the downstream coil is increased by the heat first transferred from the upstream coil, and subsequently transferred by the gas or vapor to the downstream coil. This difference in temperature in fact is proportional to the number of molecules of gas per unit time flowing through the sensor. Therefore, based on the known variation of resistances of the coils with temperature, the output signal of the bridge circuit or digital circuit provides a measure of the gas mass flow.

In various circumstances, forms of heat transfer phenomena can introduce substantial error in the measurements of these mass flow meter devices and problems for mass flow controllers. U.S. Pat. No. 3,938,384, issued Feb. 17, 1976 (the "'384 patent"), U.S. Pat. No. 4,056,975, issued Nov. 8, 1977, U.S. Pat. No. 5,191,793 (the '793 patent), issued Mar. 9, 1993, and U.S. Pat. No. 5,279,154 (the "'154 patent"), issued on Jan. 18, 1994 are illustrative of the problem.

As discussed in the '793 patent, at relatively elevated pressure levels of the gas, the error introduced by free convection of the gas within the tube becomes relatively dominant. The result, for such higher pressure levels, is a substantial error due to such convection when the device is tilted with respect to the direction of gravity. As discussed in these patents, at relatively lower pressures, the effects of this sort of convection are not substantial; however, the error introduced by free convection by the ambient gas outside the tube becomes a dominant source of error with variations in the attitude of the device with respect to gravity. In the '384 patent, this sort of convective effect is addressed by encapsulating the capillary tube with the coils thereabout, in the vicinity of the coils, with an open cell foam material. Although, as indicated in the patent, the advantages of that approach are substantial, it does bring certain detriments. First, it slows the response of the device as a result of the presence of the foam material. Second, the calibration of the device can shift with time as the foam changes its chemical composition or its degree of contact with the coils and conduit. Third, it reduces the gain of the device.

A general approach to the convection outside the conduit, of which the just-mentioned approach may be considered a specific form, involves the use of various materials to contact the coils in order to keep convective currents from transferring heat externally from one coil to the other. In addition, one must usually calibrate a sensor in a specific orientation and zero the device upon orientation change. These general approaches typically is unsatisfactory for a variety of reasons, the most important one usually being the reduction of the level of response of the device to changes in flow, and require human or system interaction depending on the type of interface to the device.

Yet more generally, flow meter devices such as those discussed above, are commonly enclosed in some type of container to isolate their sensitive parts from outside air currents and outside localized sources of heating or cooling. This, of course, is a distinct concern from the effects of convection immediately adjacent to such sensitive parts.

The present invention addresses long-standing problems and concerns with attitude sensitivity in gas mass flow meters stemming from convective heat transfer outside a tube through which the gas is directed. It does so while also addressing the goals of high sensitivity and rapid responsiveness to changes in flow rate.

SUMMARY OF THE DISCLOSURE

In accordance with one aspect, a method of compensating for attitude sensitivity of at least two thermal sensor coils mounted on a tube through which a fluid flows along a common axis of flow for use in generating a flow measurement signal representative of the flow of fluid through the tube is disclosed. One of the coils is adapted in provide thermal energy to the fluid flowing through the tube at an upstream location so as to establish and measure the upstream temperature of the fluid at the upstream location, and one of the coils is adapted to measure the downstream temperature of the fluid at a downstream location. The flow measurement signal is a function of the difference between the measured upstream and downstream temperatures. The method comprises: measuring the force of gravity in the direction of the common axis; and modifying the flow measurement signal as a function of the measured force of gravity.

In one preferred embodiment the method comprises generating a compensation signal as a function of the measured force of gravity, and modifying the flow measurement signal as a function of the compensation signal. In one preferred embodiment, the compensation signal is (a) additive with respect to the flow measurement signal when the attitude of the pair of thermal sensor coils is oriented such that thermal energy convection current provided by the coil at the upstream location and attributed to the force of gravity flows toward the coil at the downstream location, and (b) subtractive with respect to the flow measurement signal when the attitude of the pair of thermal sensor coils is oriented such that the thermal energy convection current provided by the coil at the upstream location and attributed to the force of gravity flows away from the coil at the downstream location. In another preferred embodiment, the coils have resistances that are a function of the temperatures of the coils, and the method further comprises connecting the two coils so that the flow measurement signal is a function of the difference between the resistances of the coils, and generating the compensation signal on a scale so that it can be added to the flow measurement signal so as to compensate for the attitude sensitivity of the coils.

In addition, a thermal mass flow measurement system is disclosed. The system comprises:
at least two thermal sensor coils mounted on a tube through which a fluid flows along a common axis of flow for use in generating a flow measurement signal representative of the flow of fluid through the tube, wherein (a) one of the coils is adapted in provide thermal energy to the fluid flowing through the tube at an upstream location so as to establish and measure the upstream temperature of the fluid at the upstream location, and one of the coils is adapted to measure the downstream temperature of the fluid at a downstream location, and (b) the flow measurement signal is a function of the difference between the measured upstream and downstream temperatures;
a gravity sensor fixed relative to the thermal sensor coils and constructed and arranged so as to measure the force of gravity in the direction of the common axis; and a signal modifier that modifies the flow measurement signal as a function of the measured force of gravity so as to compensate for attitude sensitivity of the thermal sensor coils.

In one preferred embodiment, the signal modifier comprises a signal generator that generates a compensation signal as a function of the measured force of gravity so that the flow measurement signal is modified as a function of the compensation signal. In another preferred embodiment, the signal generator generates the compensation signal so that it is (a) additive with respect to the flow measurement signal when the attitude of the thermal sensor coils is oriented such that thermal energy convection current provided by the coil at the upstream location and attributed to the force of gravity flows toward the coil at the downstream location, and (b) subtractive with respect to the flow measurement signal when the attitude of the pair of thermal sensor coils is oriented such that the thermal energy convection current provided by the coil at the upstream location and attributed to the force of gravity flows away from the coil at the downstream location. In another preferred embodiment, the coils have resistances that are a function of the temperatures of the coils, and the flow measurement signal is a function of the difference between the resistances of the coils, and the compensation signal is generated on a scale so that it can be added to the flow measurement signal so as to compensate for the attitude sensitivity of the coils.

SUMMARY OF THE DRAWINGS

Reference is made to the attached drawings, wherein elements having the same reference characters represent like elements throughout, and wherein.

DETAILED DESCRIPTION OF THE DRAWINGS

The disclosed method and system incorporate a low cost gravity sensor, such as a dual-axis accelerometer that is normal to the sensor's axis (orientation). The gravity sensor is configured as a tilt sensor. A compensation signal is provided as a function of the tilt angle of the sensor's axis. The compensation signal compensates the flow measurement signal based upon the orientation. Thus, a user would not have to pre-specify an orientation prior to installation.

Figure 1:
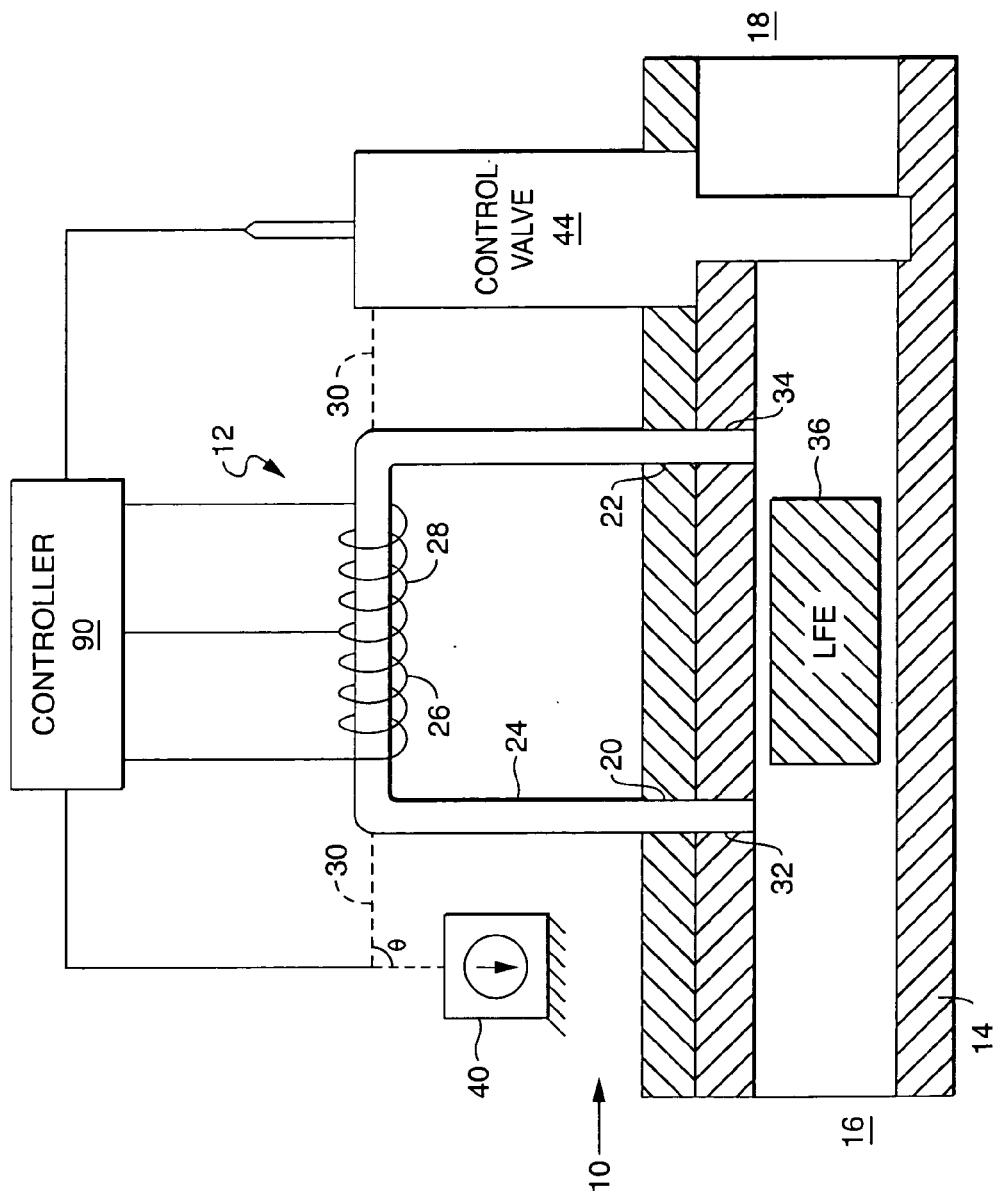
FIG. 1 is a partial schematic, in cross-section, and partial block diagram of the preferred embodiment of a mass flow controller designed in accordance with the principles of the present invention.

Referring to FIG. 1, a mass flow controller 10 includes a mass flow sensor 12 and a control valve 14. The flow sensor 12 includes a main tube 14, called a bypass, having an inlet 16 typically coupled to receive a gas or vapor from a source (not shown), and an outlet 18 typically coupled to a process system (not shown), such as a vacuum chamber, plasma generator, etc. The upstream and downstream ends 20 and 22 of a small diameter tube 24 of capillary-sized dimensions are in fluid communication with the larger tube 14 which transports the gas or vapor. The capillary tube has two coils of wire 26 and 28 wound on the outside of the capillary tube in close proximity to each other. The coils 26 and 28 are positioned on the capillary tube 24 so that their coil axes are coaxial with respect to one another about the axis 30. The coils 26 and 28 are formed from a material having a resistance which is temperature-sensitive, i.e., has a resistance as a function of temperature. Opposite ends of the capillary tube 24 are in fluid communication with the larger main tube 14 at upstream and downstream connections 32 and 34, respectively.

A laminar flow element 36 is disposed within the portion of the main tube 14, between the upstream and downstream connections 32 and 34 of the capillary tube 24 to the larger tube. As a gas or vapor flows through the sensor 12 predetermined portions of the gas flow through both the bypass and capillary tubes in a predetermined ratio known as a bypass ratio. By sensing the flow rate through the capillary tube, and knowing the bypass ratio, the flow rate through the entire sensor is proportional to the measured flow rate through the capillary tube.

The coils 26 and 28 are preferably connected in a bridge-type electrical circuit (not shown in FIG. 1), or a digital circuit for measuring the two resistances. The coils can then be heated by an electrical current to provide equal resistances in the absence of flow of the gas, and in the case of a bridge-type electrical circuit, a balanced condition for the bridge-type circuit, e.g., a null output signal. As a gas flow through the capillary tube through the sensor, the upstream coil 28 will be at a lower average temperature than the downstream coil 26. This difference in temperature is proportional to the number of molecules per unit time flowing through the tube. Since the resistance of each coil is a function of the temperature of the coil, the difference in temperature can be measured by measuring the difference in resistances of the coils. Therefore, based on the known variation of resistance of the coils with temperature, the output signal of the bridge circuit or digital circuit provides a measure of the gas mass flow.

This difference in temperature of the two coils is proportional to the number of molecules per unit time flowing through the capillary tube. Therefore, based on the known variation of resistance of the coils with temperature, the output signal of the bridge circuit or digital circuit provides a measure of the gas mass flow.

As described above, in various circumstances, forms of heat transfer phenomena can introduce substantial error in the measurements of these mass flow meter and controller devices. If the axis 30 of the coils 26 and 28 are oriented other than horizontal, ninety degrees relative to the force of gravity, external heat transfer between coils can introduce substantial error in the measurements of these mass flow meter devices and problems for mass flow controllers, particularly at low flow rates. Accordingly, a gravity sensor 40 is positioned so as to be fixed relative to the axis 30 so that the sensor provides an output as a function of the angle of axis 30 relative to the force of gravity. As the sensor is tilted relative to gravity, the gravity sensor will provide an error signal as a function of the tilt angle. Preferably, the error signal is proportional to the tilt angle between a negative minimum and a positive maximum. Thus, in the preferred embodiment the sensor 40 provides zero output when the axis 30 is normal to the force of gravity. The output of sensor 40 preferably proportionally decreases to a minimum (negative value) output when the axis 30 and force of gravity are parallel such that the heat from the upstream coil 26 transfers by convection toward the downstream coil 28 (the upstream coil 26 is below the downstream coil 28) so the error is a result from the additive heat transferred by convection by the upstream coil to the downstream coil thereby increasing the measured difference in resistances between the two coils. Conversely, the output of sensor 40 preferably proportionally increases to a maximum (positive value) output when the axis 30 and force of gravity are parallel such that the heat from the downstream coil 28 transfers by convection toward the upstream coil 26 (the upstream coil 26 is above the downstream coil 28) so the error is a result from the heat transferred by convection by the downstream coil to the upstream coil thereby decreasing the measured difference in resistances between the two coils.

Figure 2:
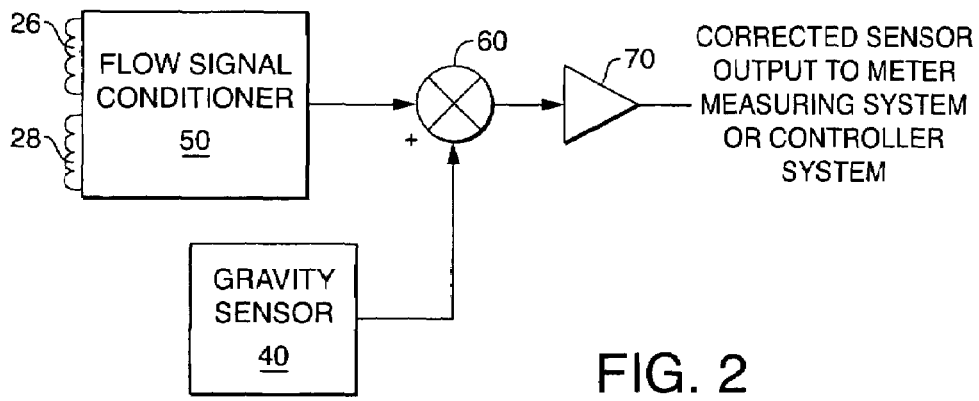
FIG. 2 is a partial circuit schematic and partial block diagram of a preferred embodiment of an electrical correction circuit designed for use with the embodiment of FIG. 1 for correcting for attitude sensitivity of the coils of the sensor.
Figure 3:
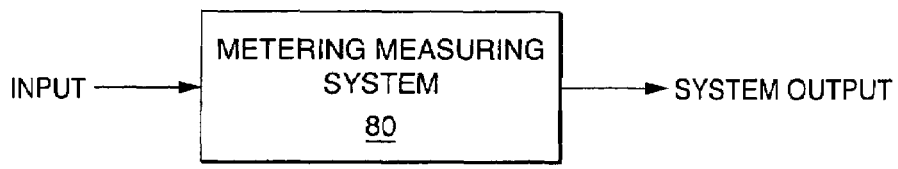
FIG. 3 is a block diagram of a mass flow measuring system using the sensor output of FIG. 2.
Figure 4:
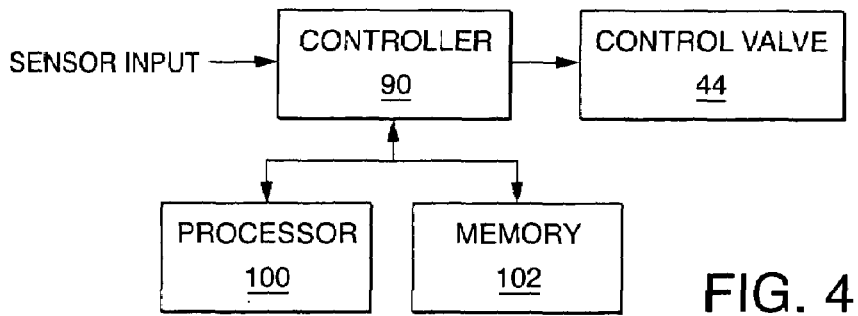
FIG. 4 is a block diagram of a mass flow controller system using the sensor output of FIG. 2.
Figure 5:
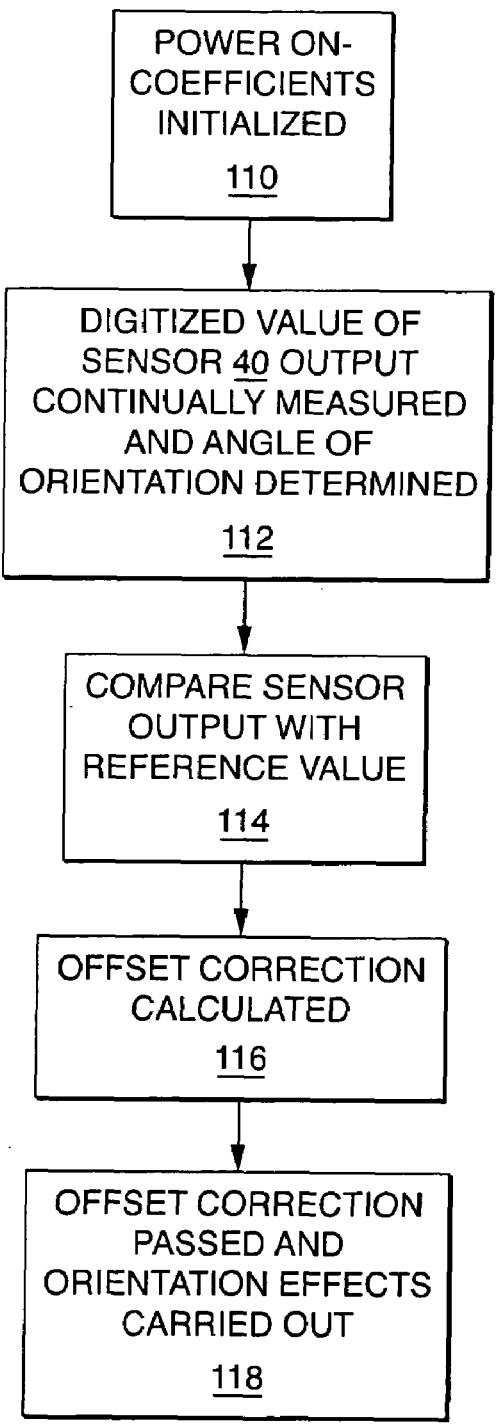
FIG. 5 is a flow chart of the operation of a mass flow controller system using the preferred embodiment of the electrical correction circuit of the type described in connection with FIGS. 2, 3 and 4.

In FIG. 2, the resistances of coils 26 and 28 are measured and conditioned by the flow signal conditioner 50. The conditioner can include the remaining components of a bridge-type electrical circuit, such as the one shown in the '793 patent, or a digital circuit for measuring the resistance of each of the coils. The output of the signal conditioner 50 is a function of the difference in resistances of the coils 26 and 28. This output and the error signal provided by the gravity sensor 40 are summed at summer 60 where the summed signal is applied to a preamplifier 70. The output from preamplifier 70 can be applied to a meter measuring system, for example shown at 80 in FIG. 3, or to the input of a mass flow controller, shown at 90 in FIG. 4, which in turn controls the control valve 14. Each of the meter measuring system and the controller 90 can include, or be connected to a digital processor and memory for storing data, indicated generally at 100 and 102, respectively. Memory 102 allows the storage of data including data relating to the attitude correction of the sensitivity of the coils. For example, the coefficients for the sensor voltage with respect to attitude of the sensor 40, attitude offsets, the reference voltage value (when the sensor 40 is in the horizontal position), and any bridge voltage offset correction values (as a function of the position of the sensor 40 as a function of attitude). An A/D converter (not shown) is also provided (whether a part of the sensor 40 or separate, so that the output of the sensor 40 can be digitized before being further processed by the processor 100. The details of the preferred method are described in connection with FIG. 5. Initially, in step 110 the device (either system 80 of FIG. 3, or the controller 90) is powered on and the coefficients for sensor voltage with respect to attitude are initialized. Attitude offsets are also preferably generated. As indicated at step 112, the digitized value of the output signal of the sensor 40 is constantly measured and the angle of orientation is determined by the processor 100.

In step 114, upon completion of the initialization of the of the system 80 or controller 90, the sensor 40 output, e.g., the voltage output of the sensor, represents the present angle. This is preferably compared by the processor 100 with the reference value, e.g., voltage, representing the horizontal position of the sensor.

At step 116, the offset correction is calculated as a function of the present sensor attitude position, and the horizontal reference position.

At step 118, the (bridge) offset correction is passed by the processor and orientation effects are carried out.

The disclosed method and system thus incorporate a low cost gravity sensor, such as a dual-axis accelerometer, that is normal to the sensors axis (orientation). The gravity sensor is configured as a tilt sensor. A compensation signal is provided as a function of the tilt angle of the sensors axis. The compensation signal compensates the flow measurement signal based upon the orientation. Thus, a user would not have to pre-specify an orientation prior to installation, providing a significant advantage.

The exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims.

What is claimed is:

1. A method of compensating for attitude sensitivity of at least two thermal sensor coils mounted on a tube through which a fluid flows along a common axis of flow for use in generating a flow measurement signal representative of the flow of fluid through the tube, wherein (a) one of the coils is adapted in provide thermal energy to the fluid flowing through the tube at an upstream location so as to establish and measure the upstream temperature of the fluid at the upstream location, and one of the coils is adapted to measure the downstream temperature of the fluid at a downstream location, and (b) the flow measurement signal is a function of the difference between the measured upstream and downstream temperatures, comprising:

measuring the force of gravity in the direction of the common axis; and modifying the flow measurement signal as a function of the measured force of gravity.

2. A method according to claim 1, further comprising generating a compensation signal as a function of the measured force of gravity, and modifying the flow measurement signal as a function of the compensation signal.

3. A method according to claim 2, further comprising generating the compensation signal so that it is (a) additive with respect to the flow measurement signal when the attitude of the pair of thermal sensor coils is oriented such that thermal energy convection current provided by the coil at the upstream location and attributed to the force of gravity flows toward the coil at the downstream location, and (b) subtractive with respect to the flow measurement signal when the attitude of the pair of thermal sensor coils is oriented such that the thermal energy convection current provided by the coil at the upstream location and attributed to the force of gravity flows away from the coil at the downstream location.

4. A method according to claim 2, wherein the coils have resistances that are a function of the temperatures of the coils, further comprising connecting the two coils so that the flow measurement signal is a function of the difference between the resistances of the coils, and generating the compensation signal on a scale so that it can be added to the flow measurement signal so as to compensate for the attitude sensitivity of the coils.

5. A thermal mass flow measurement system comprising:

at least two thermal sensor coils mounted on a tube through which a fluid flows along a common axis of flow for use in generating a flow measurement signal representative of the flow of fluid through the tube, wherein (a) one of the coils is adapted in provide thermal energy to the fluid flowing through the tube at an upstream location so as to establish and measure the upstream temperature of the fluid at the upstream location, and one of the coils is adapted to measure the downstream temperature of the fluid at a downstream location, and (b) the flow measurement signal is a function of the difference between the measured upstream and downstream temperatures;

a gravity sensor fixed relative to the thermal sensor coils and constructed and arranged so as to measure the force of gravity in the direction of the common axis; and a signal modifier that modifies the flow measurement signal as a function of the measured force of gravity so as to compensate for attitude sensitivity of the thermal sensor coils.

6. A system according to claim 5, further wherein the signal modifier comprises a signal generator that generates a compensation signal as a function of the measured force of gravity so that the flow measurement signal is modified as a function of the compensation signal.

7. A system according to claim 6, wherein the signal generator generates the compensation signal so that it is (a) additive with respect to the flow measurement signal when the attitude of the thermal sensor coils is oriented such that thermal energy convection current provided by the coil at the upstream location and attributed to the force of gravity flows toward the coil at the downstream location, and (b) subtractive with respect to the flow measurement signal when the attitude of the pair of thermal sensor coils is oriented such that the thermal energy convection current provided by the coil at the upstream location and attributed to the force of gravity flows away from the coil at the downstream location.

8. A system according to claim 6, wherein the coils have resistances that are a function of the temperatures of the coils, and the flow measurement signal is a function of the difference between the resistances of the coils, and the compensation signal is generated on a scale so that it can be added to the flow measurement signal so as to compensate for the attitude sensitivity of the coils.

* * * * *